(12) United States Patent
Kaku (10) Patent No.: US 7,584,212 B2
(45) Date of Patent: Sep. 1, 2009

(54) DATA RECORDING DEVICE

(75) Inventor: Junya Kaku, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 389 days.

(21) Appl. No.: 10/432,280

(22) PCT Filed: Nov. 21, 2001

(86) PCT No.: PCT/JP01/10191

§ 371 (c)(1),
(2), (4) Date: May 16, 2003

(87) PCT Pub. No.: WO02/45087

PCT Pub. Date: Jun. 6, 2002

(65) Prior Publication Data

US 2004/0034617 A1  Feb. 19, 2004

(30) Foreign Application Priority Data

Nov. 29, 2000 (JP) ............................. 2000-362214

(51) Int. Cl.
*G06F 7/00* (2006.01)
(52) U.S. Cl. .................. 707/104.1; 707/2; 707/101; 358/1.14; 386/124; 386/125; 386/126; 396/310; 396/315; 396/322
(58) Field of Classification Search .............. 348/231.1, 348/231.2, 231.3; 707/1, 104.1
See application file for complete search history.

(56) References Cited

U.S. PATENT DOCUMENTS

| 5,664,243 | A | * | 9/1997 | Okada et al. | ................. 396/246 |
|---|---|---|---|---|---|
| 5,715,221 | A | | 2/1998 | Ito et al. | ........................ 369/54 |
| 5,983,028 | A | * | 11/1999 | Sato | ............................. 396/30 |
| 6,064,494 | A | * | 5/2000 | Hirota et al. | .................. 358/1.9 |
| 6,330,215 | B1 | * | 12/2001 | Lim | ........................... 369/53.2 |
| 6,581,167 | B1 | * | 6/2003 | Gotoh et al. | .................... 714/7 |
| 6,728,476 | B1 | * | 4/2004 | Haseno | ....................... 386/125 |
| 7,046,275 | B1 | * | 5/2006 | Yamada et al. | ........... 348/220.1 |

FOREIGN PATENT DOCUMENTS

| JP | 03-214876 | 9/1991 |
|---|---|---|
| JP | 05-020776 | 1/1993 |
| JP | 09-147497 | 6/1997 |
| JP | 11-283358 | 3/1998 |
| JP | 2000-293948 | 10/2000 |

OTHER PUBLICATIONS

Wikipedia, "Magneto-Optical Drive", <http://simple.wikipedia.org/wiki/Magneto-optical_drive>, p. 1.*

* cited by examiner

*Primary Examiner*—Hung Q Pham
(74) *Attorney, Agent, or Firm*—Gerald T. Bodner (57) ABSTRACT

A digital camera (10) includes a CPU (46). When a power source is turned on, the CPU (46) determines an available area of a recording destination on the basis of an FAT recorded on a magneto-optical disk (44). Compressed image data created on the basis of an operation of a shutter button (48) is recorded on the determined available area. When succeeding in recording, the FAT is renewed. When failing in recording due to a defect of the magneto-optical disk (44), a message is displayed on a monitor (28). When a set key (50) is operated after displaying the message, a write protection is set on the magneto-optical disk (44).

9 Claims, 6 Drawing Sheets

| | HEAD ADDRESS | AVAILABLE SIZE |
|---|---|---|
| ① | 3 | 32 |
| ② | 71 | 245 |
| ③ | 96 | 268 |
| ④ | 48 | 503 |
| | | |
| | | |
| | | |

FIG. 7

WRITING ERROR OCCURS
MAKE DISK READ ONLY ?

▶ O K

DATA RECORDING DEVICE

TECHNICAL FIELD

The present invention relates to a data recording apparatus. More specifically, the present invention relates to a data recording apparatus for recording a data signal onto a recording medium having a plurality of available areas, and renewing position information of the available areas after completion of the recording.

PRIOR ART

As a method of recording a data signal on a recording medium, an FAT (File Allocation table) system of an MS-DOS format is well known. In the FAT system, a recording signal is handled in a cluster unit, and therefore, even when available areas are dispersively distributed due to a repetition of recording and deleting, as long as a total amount of the available areas exceeds a size of the data signal, the data signal can be recorded without problems.

However, when there causes a lot of defects on the recording medium due to deterioration by the repetition of the recording and deleting, this causes harm to a recording process of the data signal. That is, even if recording is attempted on an available area having a lot of defects, the recording results in failure, and when the recording fails, FAT is also not renewed, and whereby, recording is attempted on the same available area again. Accordingly, when a recording error occurs once due to the defect of the recording medium, the same error occurs every time the recording is attempted. If no measures are taken to such the recording medium having the defect, operability is sharply reduced.

SUMMARY OF THE INVENTION

Therefore, it is a primary object of the present invention to provide a novel data recording apparatus.

Another object of the present invention is to provide a data recording apparatus capable of improving operability.

According to the present invention, a data recording apparatus comprises an attaching means for detachably attaching a recording medium having a plurality of available areas and available area information; a determining means for determining an available area of a recording destination on the basis of the available area information; a recording means for recording a data signal on the available area determined by the determining means; a renewing means for renewing the available area information when succeeding in recording of the data signal; and a setting means for setting the recording medium to a recording prohibition state when failing in recording of the data signal due to a defect of the recording medium.

The recording medium has the plurality of available areas and available information, and such the recording medium is detachably attached by the attaching means. The determining means determines the available area of the recording destination on the basis of the available area information, and the recording means records the data signal in the determined available area. When succeeding in recording of the data signal, the available area information is renewed by the renewing means, and when failing in recording of the data signal due to the defect of the recording medium, the recording medium is set to the recording prohibition state by the setting means. Therefore, there never occurs the same recording error every time recording is performed, and therefore, it is possible to improve operability.

Preferably, when failing in recording of the data signal due to the defect of the recording medium, a predetermined message is output by an output means. The setting means sets the recording prohibition state when there is a predetermined input with respect to the predetermined message.

According to the present invention, a data recording method for recording a data signal on a recording medium having a plurality of available areas and available area information comprises steps of: (a) determining an available area of a recording destination on the basis of the available area information; (b) recording a data signal on the available area determined in the step (a); (c) renewing the available area information when succeeding in recording of the data signal; and (d) setting the recording medium to a recording prohibition state when failing in recording of the data signal due to a defect of the recording medium.

When the available area of the recording destination is determined on the basis of the available area information, the data signal is recorded on the available area. When succeeding in recording of the data signal, the available area information is renewed. However, when failing in recording of the data signal due to the defect of the recording medium, the recording medium is set to the recording prohibition state. Therefore, there never occurs the same recording error every time recording is performed, and therefore, it is possible to improve operability.

Preferably, when failing in recording of the data signal due to the defect of the recording medium, a predetermined message is output. The setting of the recording prohibition state is performed at a time there is a predetermined input with respect to the predetermined message.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
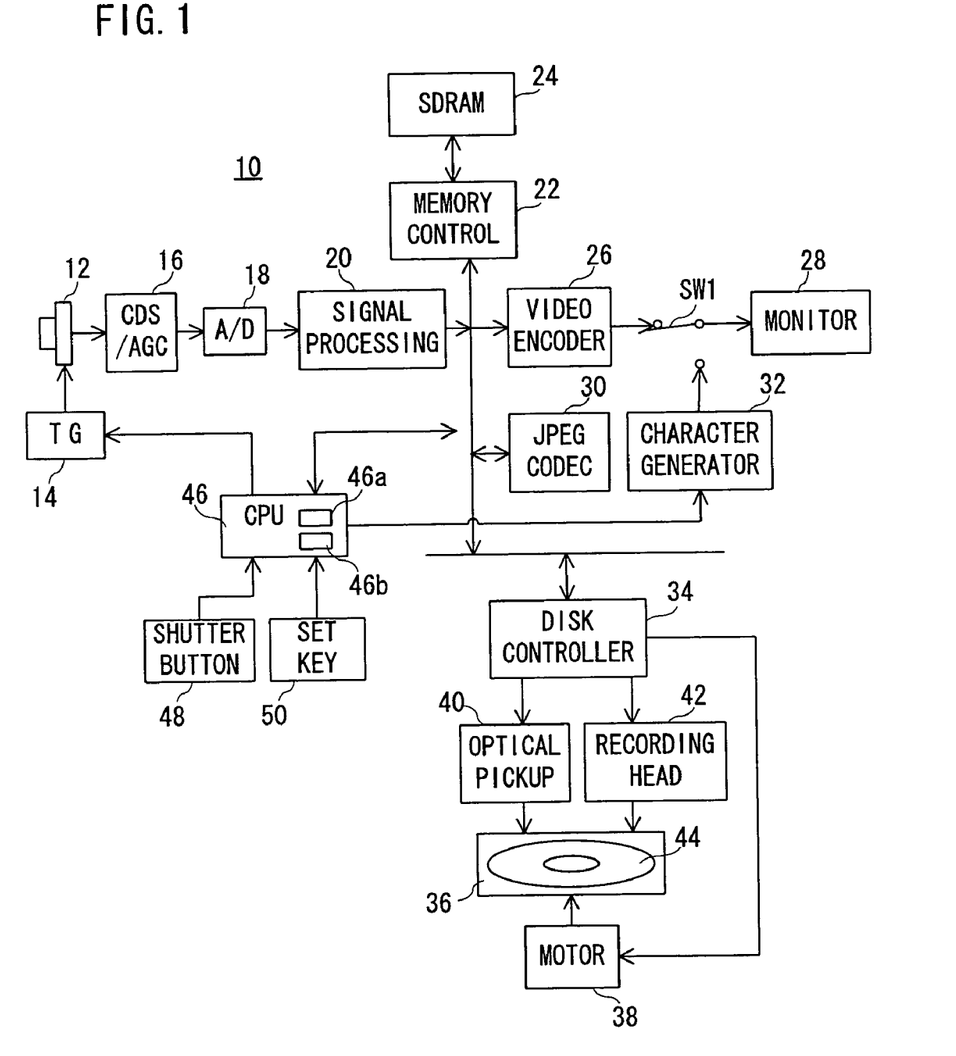
FIG. 1 is a block diagram showing one embodiment of the present invention.

Referring to FIG. 1, a digital camera 10 of this embodiment includes an image sensor 12 on which front surface a color filter (not shown) is attached. An optical image of an object is irradiated on a light-receiving surface of the image sensor 12 through the color filter.

When a power source is turned on, a CPU 46 starts-up a disk controller 34. The disk controller 34 controls a spindle motor 38, an optical pickup 40 and a recording head 42, and performs an initialization process such as test-reading, test-lighting and etc.

The CPU 46 also instructs a timing generator (TG) 14 to perform a thin-out reading and applies predetermined processing instructions to a signal processing circuit 20 and a video encoder 26. The TG 14 drives the image sensor 12 in a thin-out reading manner and whereby, a low resolution camera signal (pixel signal) corresponding to the object image is output from the image sensor 12. The output camera signal is subjected to a well-known noise removal and a level adjustment in a CDS/AGC circuit 16, and then converted to a digital signal by an A/D converter 18.

The signal processing circuit 20 performs processes such as color separation, white balance adjustment, YUV conversion and etc., and outputs YUV data thus generated to a memory control circuit 22 together with a writing request. The YUV data is written to an SDRAM 24 by the memory control circuit 22.

The video encoder 26 requests the memory control circuit 22 to read the YUV data in response to the processing instruction from the CPU 46 and converts the YUV data read by the memory control circuit 22 into a composite image signal. The converted composite image signal is applied to a monitor 28 through a switch SW1 and whereby, a real time motion image (through image) of the object is displayed on the monitor 28.

It is noted that the switch SW1 is connected to a character generator 32 at a predetermined timing when a character signal is output from the character generator 32. The character signal is mixed with the composite image signal by the switch SW1 and whereby, a character corresponding thereto is displayed on the monitor 28 in an OSD manner.

When a shutter button 48 is operated after a magneto-optical disk 44 is shifted to a recordable state, the CPU 46 instructs the TG 14 to photograph the object and read one screen of camera signal obtained by photoelectric conversion (all pixels reading). Thus, a high resolution camera signal corresponding to a still image at a time the shutter button 46 is operated is output from the image sensor 12. The output camera signal is subjected to the same process as the above description, and a high resolution YUV data is retained in the SDRAM 24.

The CPU 46 succeedingly applies a compression instruction to a JPEG codec 30. The JPEG codec 30 requests the memory control circuit 22 to read the YUV data in response to the compression instruction. When a request of reading is made, the memory control circuit 22 reads one frame of the high resolution YUV data, i.e., one screen of still image data retained in the SDRAM 24. The read still image data is applied to the JPEG codec 30 so as to be subjected to JPEG compression. When compressed image data is generated by the JPEG compression, the JPEG codec 30 applies to the memory control circuit 22 the compressed image data together with a writing request. Therefore, the compressed image data is also stored in the SDRAM 24 by the memory control circuit 22.

The CPU 46 then reads the compressed image data from the SDRAM 24 and applies to the disk controller 34 the read compressed image data together with a recording instruction. The disk controller 34 drives the optical pickup 40 and the recording head 42 so as to record the compressed image data on the magneto-optical disk 44. After completion of the recording process, the CPU 46 performs a through image display process again, and whereby, the through image is displayed on the monitor 28. It is noted that the magneto-optical disk 44 is a detachable disk recording medium and held by a slot 36 and the spindle motor 38 at a time of attachment.

Figure 2:
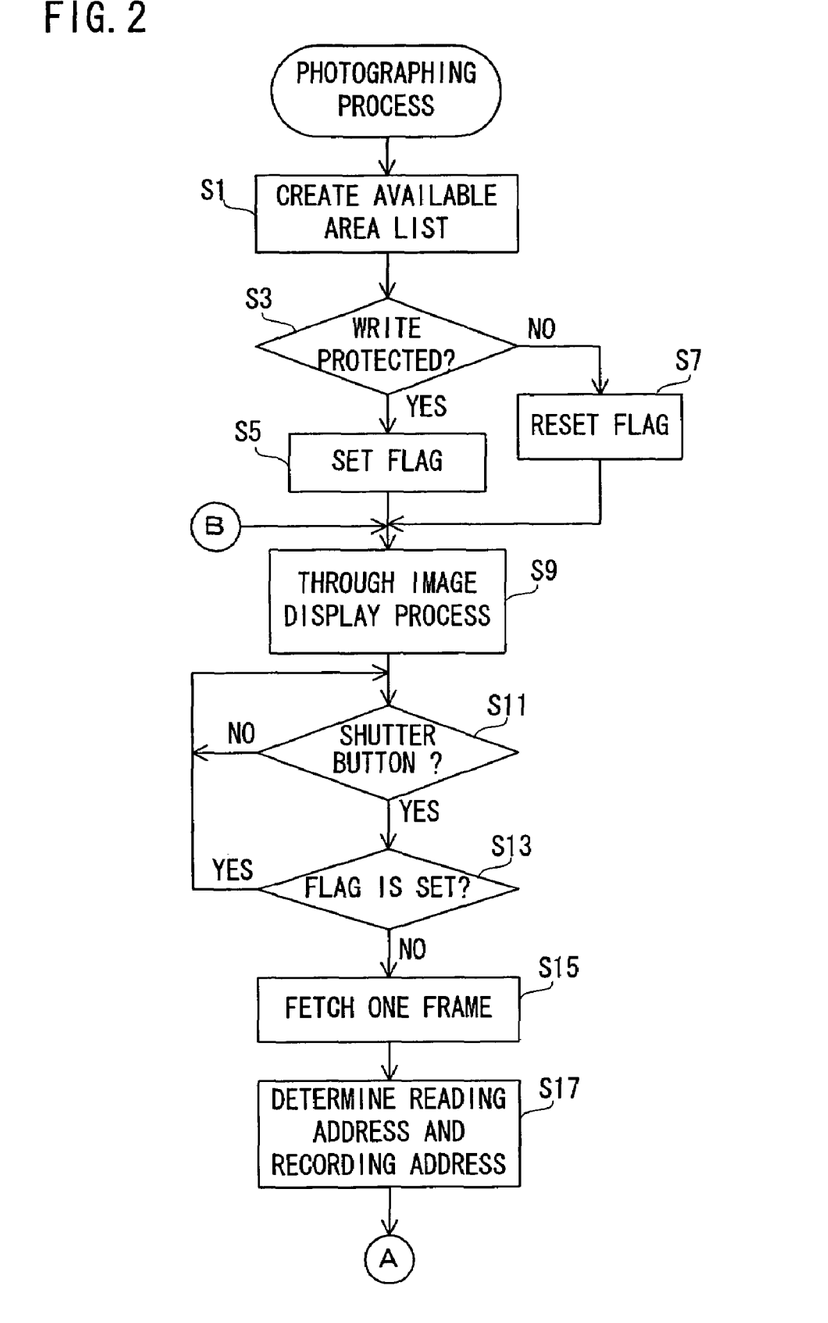
FIG. 2 is a flowchart showing a part of an operation of FIG. 1 embodiment.
Figure 3:
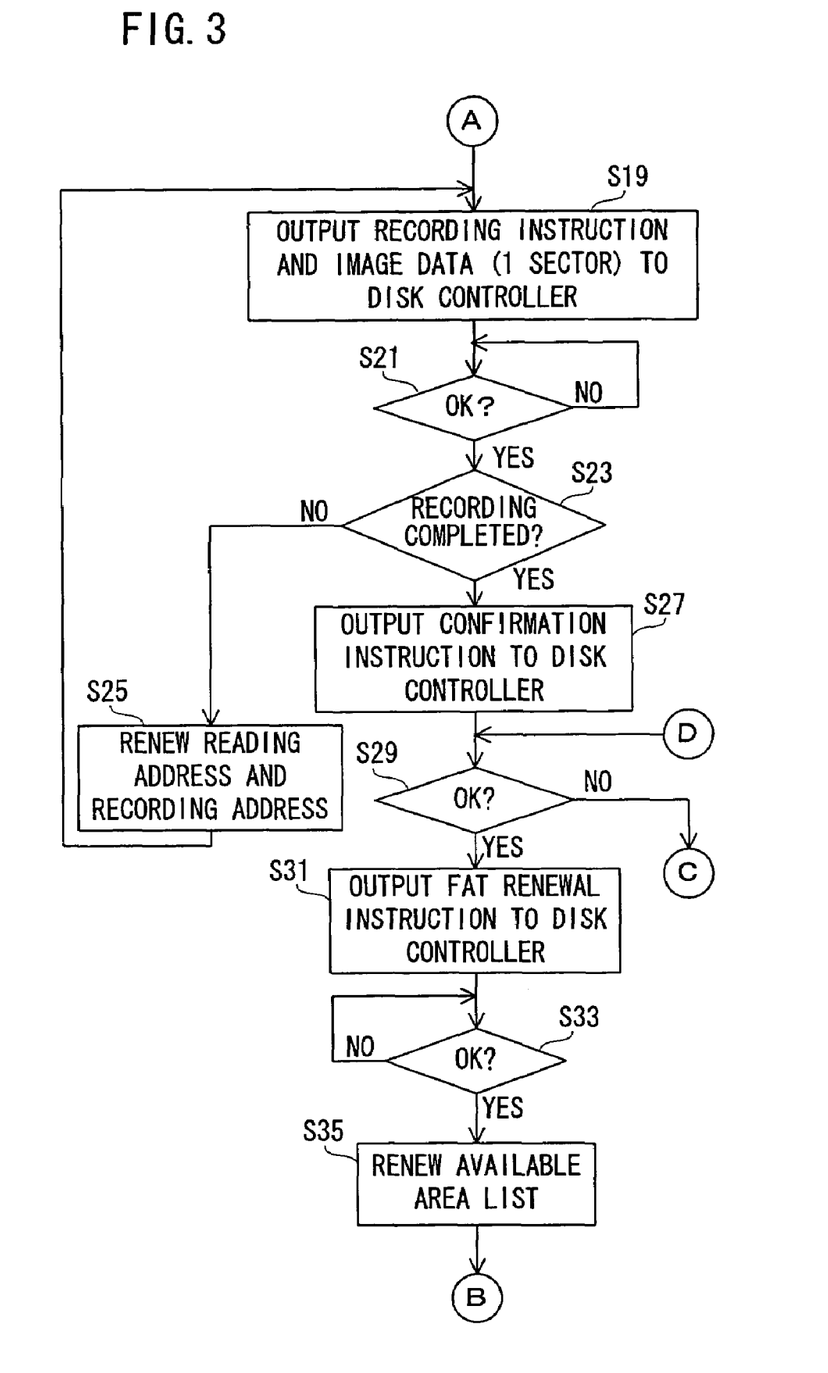
FIG. 3 is a flowchart showing a part of an operation of FIG. 1 embodiment.
Figure 4:
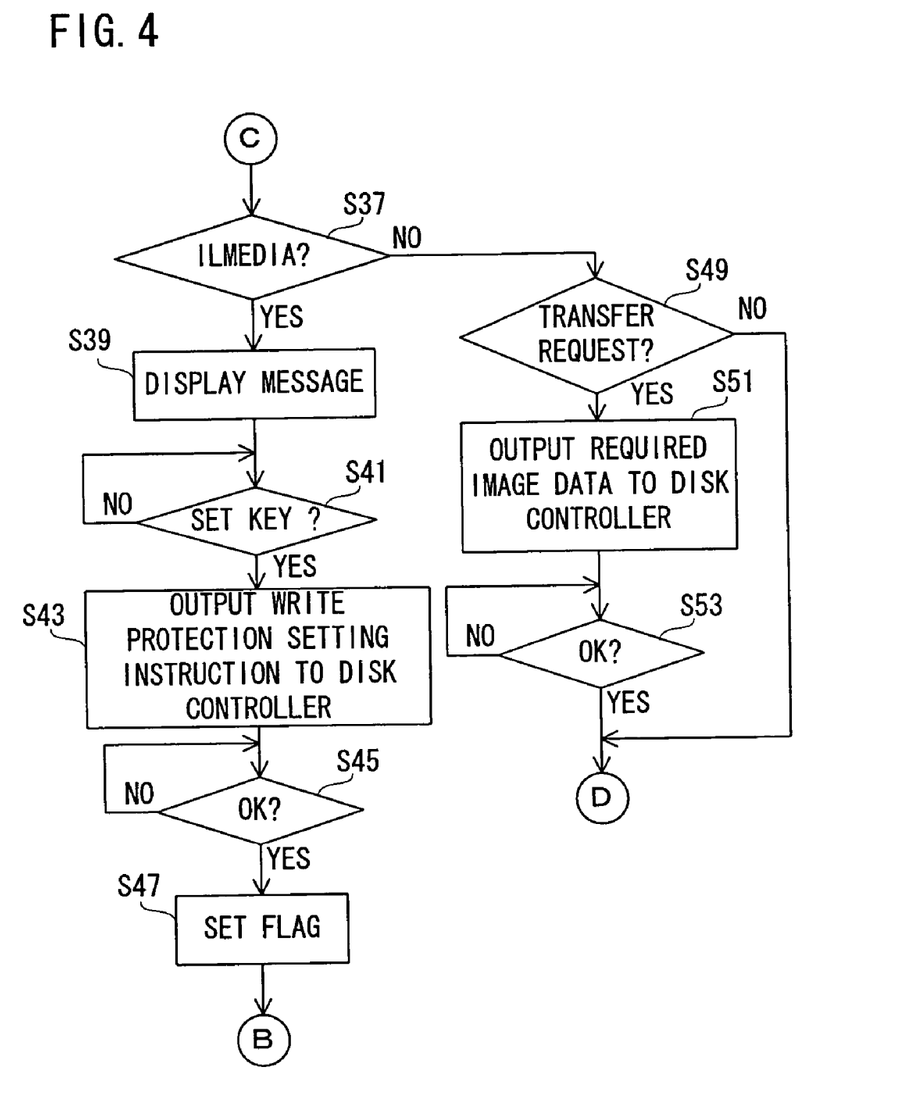
FIG. 4 is a flowchart showing another part of the operation of FIG. 1 embodiment.

The CPU 46 performs a photographing process according to a flowchart shown in FIG. 2 to FIG. 4 after the magneto-optical disk 44 has shifted to a recordable state. The CPU 46 first creates an available area list 46a in which available areas of the magneto-optical disk 44 are listed and determines an available area to be recorded at first in a step S1. Specifically described, the CPU 46 applies a detecting instruction of available capacity information to the disk controller 34, and the disk controller 34 creates the available area list 46a shown in FIG. 6 on the basis of the available capacity information (head address and size of each of available areas) detected with reference to an FAT recorded on the magneto-optical disk 44. The CPU 46 further identifies an available area having the smallest size as a recording destination available area.

Figure 5:
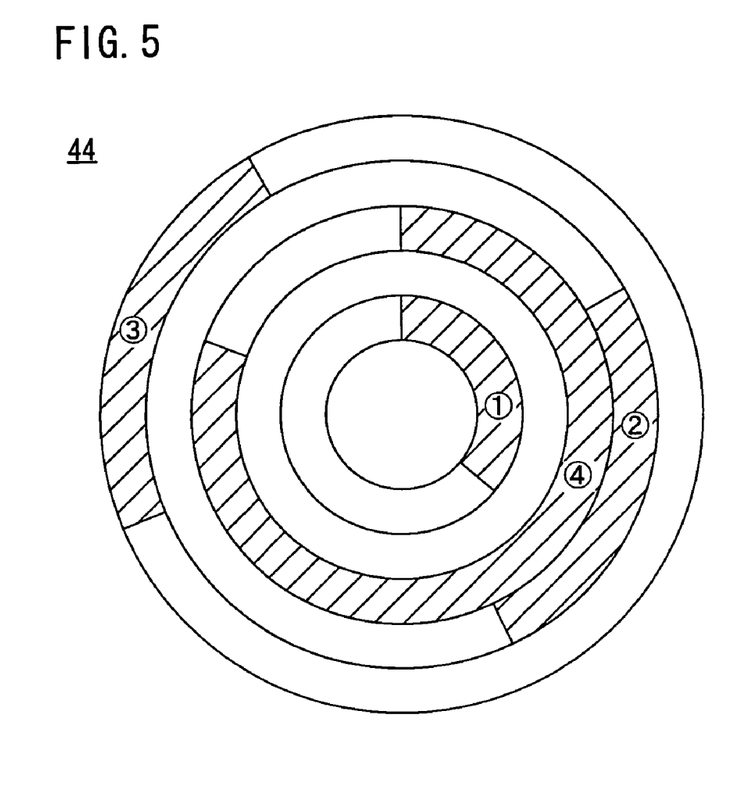
FIG. 5 is an illustrative view showing one example of a distribution state of available areas formed on a magneto-optical disk.
Figure 6:
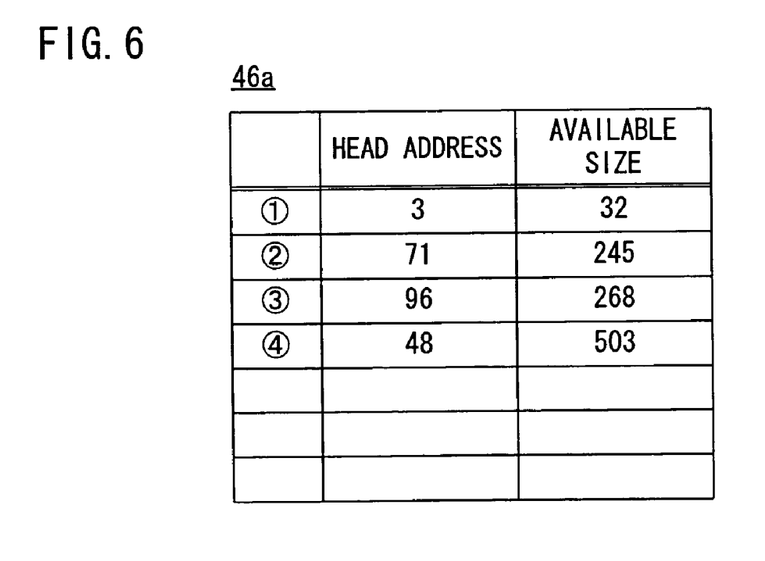
FIG. 6 is an illustrative view showing one example of an available area list.

The available area list 46a shown in FIG. 6 corresponds to available areas ① to ④ diagonally shaded in FIG. 5. According to FIG. 6, the available area ① having a size of "32" is formed on an address "3" and the subsequent, and the available area ② having a size of "245" is formed on an address "71" and the subsequent. Furthermore, the available area ③ having a size of "268" is formed on an address "96" and the subsequent, and the available area ④ having a size of "503" is formed on an address "48" and the subsequent.

Returning to FIG. 2, the CPU 46 determines whether or not the magneto-optical disk 44 is under a write protection in a step S3. More specifically, the CPU 46 applies an identifying instruction of a protection state to the disk controller 34 and determines whether or not the write protection is present on the basis of an identification result sent back from the disk controller 34. If under the write protection, the CPU 46 sets a flag 46b in a step S5, and if out of the write protection, the CPU 46 resets the flag 46b in a step S7.

After completion of setting or resetting the flag 46b, the CPU 46 proceeds to a step S9 so as to perform a through image display process. That is, the CPU 46 applies a thin-out reading instruction to the TG 14 and applies the predetermined processing instructions to the signal processing circuit 20 and the video encoder 26. Thus, a through image is displayed on the monitor 28. When the shutter button 48 is depressed by an operator, the CPU 46 determines "YES" in a step S11 and identifies a state of the flag 46b in a step S13. If the flag 46b is reset, the CPU 46 performs processes in a step S15 and the subsequent. If the Flag 46b is set, the CPU 46 returns to the step S11. That is, if the magneto-optical disk 44 is under the write protection, the operation of the shutter button 48 is invalidated.

If the process proceeds to a step S15, the CPU 46 performs a capturing process of one frame of an object image. More specifically, the CPU 46 applies the all pixels reading instruction to the TG 14 and applies the compression instruction to a JPEG codec 30 at a timing that one frame of high resolution YUV data is written to the SDRAM 24. The JPEG codec 30 performs the JPEG compression to the high resolution YUV data, and compressed image data is stored in the SDRAM 24.

The CPU 46 succeedingly determines a reading address of the SDRAM 24 and a recording address of the magneto-optical disk 44 in a step S17. The reading address is a head address of the compressed image data, and the recording address is a head address of the available area determined in the step S1 (or step S35 described later). In a step S19, the CPU 46 reads one sector of the compressed image data from the determined reading address and the subsequent, and applies the read compressed image data to the disk controller 34 together with a recording instruction. The recording instruction includes the recording address determined in the step S17 (or a step S25 described later). The disk controller 34 records on the magneto-optical disk 44 one sector of the compressed image data applied together with the recording instruction according to the recording address included in the recording instruction, and after the recording, sends an identifier "OK" back to the CPU 46.

When "OK" is sent back from the disk controller 34, the CPU 46 determines "YES" in a step S21 and determines whether or not the recording of the one frame of the compressed image data is completed in a step S23. If the recording is not completed, the CPU 46 proceeds to a step S25 and renews the reading address of the SDRAM 24 and the recording address of the magneto-optical disk 44 by predetermined bytes. After completion of the renewal, the CPU 46 returns to the step S19. Therefore, one frame of the compressed image data is recorded on the magneto-optical disk 44 at every sector.

After completion of recording the one frame of the compressed image data, the CPU 46 proceeds from the step S23 to a step S27 so as to apply a confirmation instruction for confirming appropriate recording of the compressed image data to the disk controller 34. A repetition of recording/reproducing over the long term deteriorates quality of the magneto-optical disk 44 and causes a lot of defects on a recording surface. Data recorded on a sector having such a defect cannot be reproduced properly. This is the reason why the confirmation instruction is output at a time of completion of recording the compressed image data, and it is determined whether recording is made on the sector having the defect or not.

The disk controller 34 reproduces the compressed image data which has been recorded this time at every sector and determines whether or not the compressed image data (ECC encode signal) of each sector is properly decoded. When the decoding is properly performed on all the sectors, an identifier indicative of "OK" is sent back from the disk controller 34 to the CPU 46. On the one hand, if the decoding is not properly performed in one part of sectors, a transfer request is sent back from the disk controller 34 to the CPU 46 in order to recode the compressed image data to be recorded on the sector on another alternative area. On the other hand, when the alternative area is full due to the large amount of defects, the disk controller 34 determines a further recording being impossible and sends back the identifier indicative of "ILMEDIA" to the CPU 46.

When "OK" is sent back from the disk controller 34, the CPU 46 determines "YES" in a step S29 and outputs an FAT renewal instruction to the disk controller 34 in a step S31. The disk controller 34 renews the FAT recorded on the magneto-optical disk 36 in response to the renewal instruction and sends back "OK" at a time of completing the renewal. When "OK" is sent back due to the renewal of the FAT, the CPU 46 determines "YES" in a step S33, and performs a renewal of the available area list 46a and determination of an available area for the next recording in a step S35. After completion of the process in the step S35, the CPU 46 returns to the step S9.

When a transfer request is sent back from the disk controller 34, the CPU 46 proceeds from a step S49 to a step S51 so as to output the required compressed image data to the disk controller 34. The transfer request includes the address data of the sector having defects, and the CPU 46 reads the one sector of the compressed image data from the SDRAM 24 on the basis of the address data so as to be output to the disk controller 34. The disk controller 34 records the applied compressed image data to the alternative area, and after completion of the recording, "OK" is sent back to the CPU 46. When "OK" is sent back, the CPU 46 determines "YES" in a step S53 and returns to the step S29. The disk controller 34 determines whether or not the recording is properly performed as to the compressed image data recorded on the alternative area and sends back "OK", "ILMEDELIA" or a transfer request to the CPU 46. Accordingly, the CPU 46 returns to the step S29 when "YES" is determined in the step S53 also.

Figure 7:
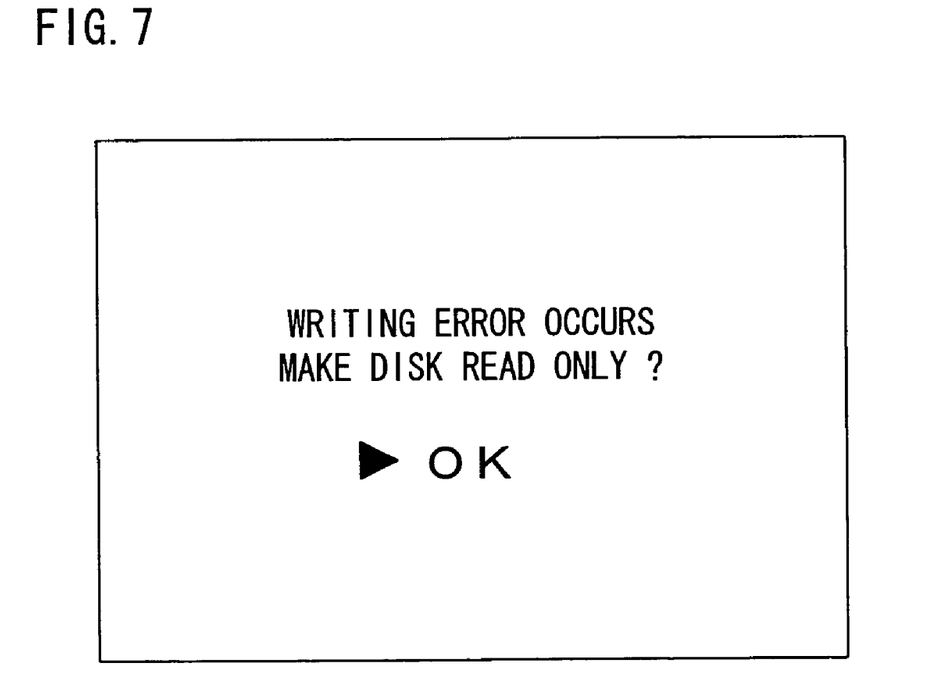
FIG. 7 is an illustrative view showing one example of a message displayed on a monitor.

When "ILMEDIA" is sent back from the disk controller 34, the CPU 46 proceeds from a step S37 to a step S39 so as to apply a predetermined character signal to the monitor 28 by controlling the character generator 32 and the switch SW1. The monitor 28 is displayed with a message of "WRITING ERROR OCCUR. MAKE DISK READ ONLY?" and a letter of "OK", and a cursor points out "OK".

Herein, when the operator operates a set key 50, the CPU 46 determines "YES" in a step S41 and outputs a write protection setting instruction to the disk controller 34 in a step S43. The disk controller sets a write protection to the magneto-optical disk 44 in response to the write protection setting instruction. The magneto-optical disk 44 is shifted to a recording prohibition state, i.e., is read only (reproduced only). After completion of setting the write protection, the disk controller 34 sends back "OK" to the CPU46. The CPU 46 determines "YES" in a step S45 when "OK" is sent back, and sets the flag 46b in a step S47 and then, the process returns to the step S9.

As can be understood from the above description, the available area list 46a is created on the basis of the FAT recorded on the magneto-optical disk 44, and the recording destination available area is determined. The compressed image data created on the basis of the operation of the shutter button 48 is recorded on the determined available area, and when succeeding in recording, the FAT is renewed. However, when failing in recording due to the defect of the magneto-optical disk 44, a message is displayed on the monitor 28, and the write protection is set on the magneto-optical disk 44 in response to the operation of the set key 50.

The FAT is renewed after one frame of the compressed image data is recorded. In other words, when failing in recording, the FAT is never renewed, and if no process is performed at a time of the failure, recording is performed on the same available area again. Consequently, when a recording error occurs due to the defect of the magneto-optical disk 44, the same recording error occurs repeatedly every time recording is attempted. In this embodiment, when the recording error occurs due to the defect of the magneto-optical disk 44, the write protection is set on the magneto-optical disk 44, and therefore, no recording error occurs every time the recording is attempted. Thus, operability can be improved.

It is noted that the FAT system is adopted as a recording system of the compressed image data in this embodiment, a UDF (Universal Disc Format) system may be adopted alternatively.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data recording apparatus which records data on a recording medium having a plurality of available areas and available area information, comprising:
a processor; and
an application program embedded in a memory and executed by the processor, the executed application program performs steps comprising:
receiving compressed image data;

determining at least one available area which satisfies a predetermined area condition out of the plurality of available areas of the recording medium in reference to the available area information;

recording the compressed image data into the determined at least one available area;

identifying success/failure of the recording;

decoding the compressed image data recorded into the determined at least one available area in response to the identified success;

determining whether the compressed image data is properly decoded and determining that a defect other than inadequate available area exists on the recording medium if the compressed image data is not properly decoded;

renewing the available area information in response to an identification result indicates properly decoding; and setting said recording medium to a recording prohibition state in response to the identified failure even though there is at least one available area on said recording medium, wherein the identified failure is failure caused by a defect of said recording medium, and the recording prohibition state is a state that said recording medium can be used only in the read only mode out of recording mode and read only mode.

2. The data recording apparatus according to claim 1, further comprising outputting a message when the identification result of said identifier indicates failure, wherein setting said recording medium to the recording prohibition state is performed in response to an operation directed to the outputted message.

3. The data recording apparatus according to claim 2, wherein said recording medium is a detachable magneto-optical disk.

4. The data recording apparatus according to claim 1, wherein said recording medium is a detachable magneto-optical disk.

5. The data recording apparatus according to claim 1, further comprising an imaging device for imaging an object scene, wherein image data is still image data corresponding to the object scene imaged in response to an imaging operation, and identifying success/failure is performed every time recording of the compressed image data is completed.

6. The data recording apparatus according to claim 1, wherein said predetermined area condition is that the at least one available area has a smallest size as a recording destination available area.

7. The data recording apparatus according to claim 1, wherein the compressed image data recorded on the recording medium is reproduced in response to the identified success.

8. A data recording method which records data on a recording medium having a plurality of available areas and available area information, comprising the steps of:

(a) determining, by a data recording apparatus, at least one available area which satisfies a predetermined area condition out of the plurality of available areas of the recording medium in reference to the available area information in response to receiving compressed image data;

(b) recording, by the data recording apparatus, the compressed image data into the at least one available area determined by said step (a);

(c) identifying, by the data recording apparatus, success/failure of the recording by said step (b), the identifying step including the further steps of:

(c1) decoding, by the data recording apparatus, the compressed image data recorded into the at least one available area by said step (b) in response to the identified success; and (c2) determining, by the data recording apparatus, whether the compressed image data is properly decoded by said step (c1) and determining that a defect other than inadequate available area exists on the recording medium if the compressed image data is not properly decoded by said step (c1);

(d) renewing, by the data recording apparatus, the available area information in response to an identification result indicates properly decoding by said step (c2); and (e) setting, by the data recording apparatus, said recording medium to a recording prohibition state in response to identification result of said step (c) indicates failure, wherein the failure identified by said step (c) is failure caused by a defect of said recording medium, and the recording prohibition state is a state that said recording medium can be used only in the read only mode out of recording mode and read only mode.

9. The data recording method according to claim 8, further comprising the steps of (f) outputting a message when the identification result of said step (c) indicates failure, wherein said step (e) is a step of performing a setting process in response to an operation directed to the message output by said step (f).

* * * * *